United States Patent
Bisaro et al.

(10) Patent No.: US 10,770,730 B2
(45) Date of Patent: Sep. 8, 2020

(54) THROUGH-WALL CURRENT COLLECTOR FOR A POUCH CELL

(71) Applicant: Robert Bosch GmbH, Stuttgart (DE)

(72) Inventors: Adam Bisaro, Orion, MI (US); Mark Kotik, Rochester Hills, MI (US); Robert Schoenherr, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 195 days.

(21) Appl. No.: 15/764,829

(22) PCT Filed: Dec. 6, 2016

(86) PCT No.: PCT/EP2016/079839
§ 371 (c)(1),
(2) Date: Mar. 29, 2018

(87) PCT Pub. No.: WO2017/102420
PCT Pub. Date: Jun. 22, 2017

(65) Prior Publication Data
US 2018/0287161 A1    Oct. 4, 2018

Related U.S. Application Data

(60) Provisional application No. 62/269,693, filed on Dec. 18, 2015.

(51) Int. Cl.
*H01M 4/64* (2006.01)
*H01M 2/02* (2006.01)
(Continued)

(52) U.S. Cl.
CPC .......... *H01M 4/64* (2013.01); *H01M 2/0275* (2013.01); *H01M 2/06* (2013.01); *H01M 2/1016* (2013.01);
(Continued)

(58) Field of Classification Search
CPC .... H01M 2/0275; H01M 2/06; H01M 2/1016; H01M 2/14; H01M 2/202; H01M 2/266;
(Continued)

(56) References Cited

U.S. PATENT DOCUMENTS

| 6,818,025 B1 | 11/2004 | Ura |
| 2002/0150817 A1 | 10/2002 | Grubb et al. |

(Continued)

FOREIGN PATENT DOCUMENTS

| DE | 102012212256 | 1/2014 |
| JP | H09-199173 | 7/1997 |

(Continued)

OTHER PUBLICATIONS

EPO website (www.espacenet.com) machine translation of the detailed description of JP 2002-279969A (Year: 2002).*
PCT International Search Report for PCT/EP2016/079839.

*Primary Examiner* — Gregg Cantelmo
(74) *Attorney, Agent, or Firm* — Kelly McGlashen; Maginot, Moore & Beck LLP (57) ABSTRACT

A pouch cell (20A, 20) includes a generally rectangular cell housing (20, 21) formed of a metal laminated film, an electrode assembly (60) that is sealed within the cell housing (20, 21), and a current collector device disposed in the cell housing (20, 21). The electrode assembly (60) includes positive electrode portions alternating with negative electrode portions, the positive electrode portions and the negative electrode portions being separated by at least one separator and stacked along a stack axis (66). The current collector device is electrically connected to one of the positive electrode portions and the negative electrode portions and exits the cell housing (20, 21) via an opening (28, 428) formed in the cell housing (20, 21). The opening (28, 428) is formed in a side (22, 24) wall of the cell housing (20, (Continued)

21) at a location spaced apart from the sealed joint (40) that closes the cell housing (20, 21) and at a location facing the stack axis (66).

20 Claims, 10 Drawing Sheets

(51) Int. Cl.
*H01M 2/06* (2006.01)
*H01M 2/20* (2006.01)
*H01M 2/26* (2006.01)
*H01M 2/30* (2006.01)
*H01M 2/10* (2006.01)
*H01M 2/14* (2006.01)
*H01M 2/04* (2006.01)
*H01M 4/02* (2006.01)

(52) U.S. Cl.
CPC ............. *H01M 2/14* (2013.01); *H01M 2/202* (2013.01); *H01M 2/266* (2013.01); *H01M 2/30* (2013.01); *H01M 2/0456* (2013.01); *H01M 2004/027* (2013.01); *H01M 2004/028* (2013.01)

(58) Field of Classification Search
CPC ........ H01M 2/30; H01M 2/0456; H01M 4/64; H01M 2004/027; H01M 2004/028
See application file for complete search history.

(56) References Cited

U.S. PATENT DOCUMENTS

| | | | |
|---|---|---|---|
| 2004/0180260 A1* | 9/2004 | Somatomo | H01M 2/0426 429/174 |
| 2006/0115723 A1 | 6/2006 | Ando et al. | |
| 2011/0129711 A1 | 6/2011 | Ahn et al. | |
| 2012/0288744 A1* | 11/2012 | Guen | H01M 2/206 429/158 |
| 2013/0236768 A1* | 9/2013 | Park | H01M 10/04 429/158 |
| 2014/0087217 A1 | 3/2014 | Zink et al. | |

FOREIGN PATENT DOCUMENTS

| | | | |
|---|---|---|---|
| JP | H10-106516 | | 4/1998 |
| JP | H11-345604 | | 12/1999 |
| JP | 2002-231197 | | 8/2002 |
| JP | 2002231197 | | 8/2002 |
| JP | 2002279969 | | 9/2002 |
| JP | 2002279969 A | * | 9/2002 |
| JP | 2005251548 | | 9/2005 |
| JP | 2010-40225 | | 2/2010 |
| JP | 2011204405 A | * | 10/2011 |
| JP | 2012-84541 | | 4/2012 |
| JP | 2012084541 | | 4/2012 |
| JP | 2015195197 | | 11/2015 |
| KR | 100986566 | | 10/2010 |
| WO | 2004059760 | | 7/2004 |
| WO | 2013139529 | | 9/2013 |
| WO | 2015021435 | | 2/2015 |

* cited by examiner

THROUGH-WALL CURRENT COLLECTOR FOR A POUCH CELL

BACKGROUND

1. Field of the Invention

The present invention relates to battery cell that includes a stacked or rolled arrangement of electrode plates, and a current collector device disposed in the battery cell that forms an electrical connection with the electrode plates within the battery cell and permits transfer of current out of the cell via an opening in the battery cell pouch housing.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in two or three dimensional arrays and are electrically connected in series or in parallel. Likewise, the battery modules within a battery pack are electrically connected in series or in parallel.

Different cell types have emerged in order to deal with the space requirements of a very wide variety of installation situations, and the most common types used in automobiles are cylindrical cells, prismatic cells, and pouch cells. Regardless of cell type, each cell may include a cell housing and an electrode assembly disposed in the cell housing. The electrode assembly includes a series of stacked or rolled positive electrode plates that alternate with negative electrode plates and are separated by an intermediate separator plates. Each cell may also include a first current collector that is electrically connected to the positive electrode plates and joins the positive electrode plates to a positive cell terminal disposed outside the cell housing, and a second current collector that is electrically connected to the negative electrode plates and joins the negative electrode plates to a negative cell terminal disposed outside the cell housing.

In a pouch cell, the first and second current collectors typically each include a lead tab that passes out of the pouch between two stacked layers of pouch fabric and along a weld line that joins the layers of pouch fabric together and forms a sealed joint. The lead tab is used to pass current from inside the pouch cell housing to the outside where it can be electrically connected to an external structure such as a terminal. A special sealing tape is used to surround the lead tab at the sealed joint where the lead tab passes between the layers and out of the pouch. The sealing tape is relatively expensive since it is required to have very specific material properties. For example, the sealing tape is required to remain solid, tacky and pliable in all conditions except when localized heat is applied as occurs during the pouch fabric welding operation. When localized heat is applied, the sealing tape is required to melt, flow into open gaps between materials, and bond to both the pouch material and the respective lead tabs. A need exists for a relatively simple and less costly structure for passing current from inside the pouch cell housing to the outside where it can be electrically connected to an external structure such as a terminal or another cell.

SUMMARY

A pouch cell includes an electrode assembly that is sealed within a pouch-type, metal laminated film cell housing along with an electrolyte to form a power generation and storage unit. The electrode assembly may be a "stacked" electrode assembly that includes a series of stacked positive electrode plates alternating with negative electrode plates and separated by an intermediate separator plates. In addition, the pouch cell includes a current collector device that forms an electrical connection with a corresponding one of the electrode plates and allows passage of current generated in the electrode assembly to pass through the current collector and out of the cell while maintaining a hermetically sealed pouch cell housing.

In some aspects, an electrochemical cell includes a cell housing formed of a flexible sheet. The cell housing has a first housing portion, and a second housing portion that is joined to the first housing portion along a sealed joint to form a pouch. The cell includes an electrode assembly disposed in the cell housing. The electrode assembly includes positive electrode portions alternating with negative electrode portions. The positive electrode portions and the negative electrode portions are separated by at least one separator and stacked along a stack axis. In addition, the cell includes a current collector device that is electrically connected to one of the positive electrode portions and the negative electrode portions and exits the cell housing via an opening formed in the cell housing. The first housing portion includes a base and a sidewall that protrudes from a perimeter of the base and surrounds the base to form an open-ended container. The stack axis extends in a direction perpendicular to the base. The opening is formed in the sidewall at a location spaced apart from the sealed joint and at a location facing the stack axis. The current collector device includes a current collecting plate and a terminal plate. The current collecting plate is disposed between the sidewall and the one of the positive electrode portions and the negative electrode portions, is electrically connected to the one of the positive electrode portions and the negative electrode portions, is oriented parallel to the sidewall, and overlies the opening. The terminal plate is oriented parallel to the sidewall, overlies the opening and is disposed outside the cell housing. The terminal plate directly contacts the current collecting plate via the opening so as to form an electrical connection with the current collecting plate.

The electrochemical cell may include one or more of the following features: A force is applied to the terminal plate that urges the terminal plate into direct contact with the current collecting plate. The terminal plate and the current collecting plate form a weld-free electrical connection. The current collecting plate is welded to the terminal plate, and the weld is positioned in the opening. The cell includes a second current collector that is electrically connected to another one of the positive electrode portions and the negative electrode portions and exits the cell housing via a second opening formed in the cell housing. The cell housing is rectangular including a first end, an opposed second end, and four sides that extend between the first end and the second end, and the first opening is formed in one of the four sides, and the second opening is formed in another of the four sides. The first opening is formed in one of the four sides, and the second opening is formed in a side opposed to the one of the four sides. The first opening is formed in one of the four sides, and the second opening is formed in a side adjacent to the one of the four sides. One the terminal plate and the current collecting plate includes a protrusion that protrudes through the opening toward the other of the terminal plate and the current collecting plate and forms an electrical connection with the other of the terminal plate and the current collecting plate. The current collector device includes a seal that surrounds the opening, and the seal is disposed between the sidewall and one of the terminal plate and the current collecting plate. Each of the terminal plate and the current collecting plate include a first side and an opposed second side, and each of the first side and the second side is generally planar and free of surface features. The current collector device consists of the current collecting plate and the terminal plate.

In some aspects, an electrochemical cell includes a cell housing formed of a flexible sheet, the cell housing having a first housing portion, and a second housing portion that is joined to the first housing portion along a sealed joint to form a pouch. The cell includes an electrode assembly disposed in the cell housing. The electrode assembly includes positive electrode portions alternating with negative electrode portions, and the positive electrode portions and the negative electrode portions are separated by at least one separator and stacked along a stack axis. The cell includes a current collector device that is electrically connected to one of the positive electrode portions and the negative electrode portions and exits the cell housing via an opening formed in the cell housing. The first housing portion comprises a base and a sidewall that protrudes from a perimeter of the base and surrounds the base to form an open-ended container. The stack axis extends in a direction perpendicular to the base. The opening is formed in the sidewall at a location spaced apart from the sealed joint and at a location facing the stack axis. The current collector device consists of a current collecting plate. The current collecting plate is disposed between the sidewall and the one of the positive electrode portions and the negative electrode portions, electrically connected to the one of the positive electrode portions and the negative electrode portions, oriented parallel to the sidewall and positioned so as to overlie the opening, and includes a protrusion that extends through the opening and forms a terminal.

The electrochemical cell may include one or more of the following features: The protrusion is formed integrally with the plate and terminates in a planar surface. The cell includes a second current collector device that is electrically connected to another one of the positive electrode portions and the negative electrode portions and exits the cell housing via a second opening formed in the cell housing.

In some aspects, a battery pack includes electrochemical cells. Each electrochemical cell includes a cell housing formed of a flexible sheet. The cell housing has a first housing portion, and a second housing portion that is joined to the first housing portion along a sealed joint to form a pouch. Each cell includes an electrode assembly disposed in the cell housing. The electrode assembly includes positive electrode portions alternating with negative electrode portions. The positive electrode portions and the negative electrode portions are separated by at least one separator and stacked along a stack axis. Each cell also includes a current collector device that is electrically connected to one of the positive electrode portions and the negative electrode portions and exits the cell housing via an opening formed in the cell housing. The first housing portion comprises a base and a sidewall that protrudes from a perimeter of the base and surrounds the base to form an open-ended container. The stack axis extends in a direction perpendicular to the base. The opening is formed in the sidewall at a location spaced apart from the sealed joint and at a location facing the stack axis, and a portion of the current collector device of one of the electrochemical cells directly contacts and forms an electrical connection with a portion of a current collector device of an adjacent electrochemical cell.

The battery pack may include one or more of the following features: The current collector device includes a current collecting plate and a terminal plate. The current collecting plate is disposed between the sidewall and the one of the positive electrode portions and the negative electrode portions, is electrically connected to the one of the positive electrode portions and the negative electrode portions, is oriented parallel to the sidewall, and overlies the opening. The terminal plate is oriented parallel to the sidewall, overlies the opening and is disposed outside the cell housing, the terminal plate directly contacting the current collecting plate via the opening so as to form an electrical connection with the current collecting plate. One of the terminal plate and the current collecting plate includes a protrusion that protrudes through the opening toward the other of the terminal plate and the current collecting plate and forms an electrical connection with the other of the terminal plate and the current collecting plate. The current collector device includes a seal that surrounds the opening, and the seal is disposed between the sidewall and one of the terminal plate and the current collecting plate. The current collector device consists of a current collecting plate that is disposed between the sidewall and the one of the positive electrode portions and the negative electrode portions, electrically connected to the one of the positive electrode portions and the negative electrode portions, oriented parallel to the sidewall and positioned so as to overlie the opening, and includes a protrusion that extends through the opening and forms a terminal.

Advantageously, the current collector device is disposed at a location that is spaced apart from the sealed joint used to form the pouch cell, and particularly at a location overlying an opening in the pouch sidewall, where the opening faces (lies in a plane parallel to) the stack axis of the electrode assembly. By forming the opening at this location rather than at the sealed joint, commonly available sealing materials can be used to prevent leakage about the current collector device, whereby the use of the relatively costly sealing tape can be eliminated and the cost to manufacture the cell is reduced.

DETAILED DESCRIPTION

Figure 1:
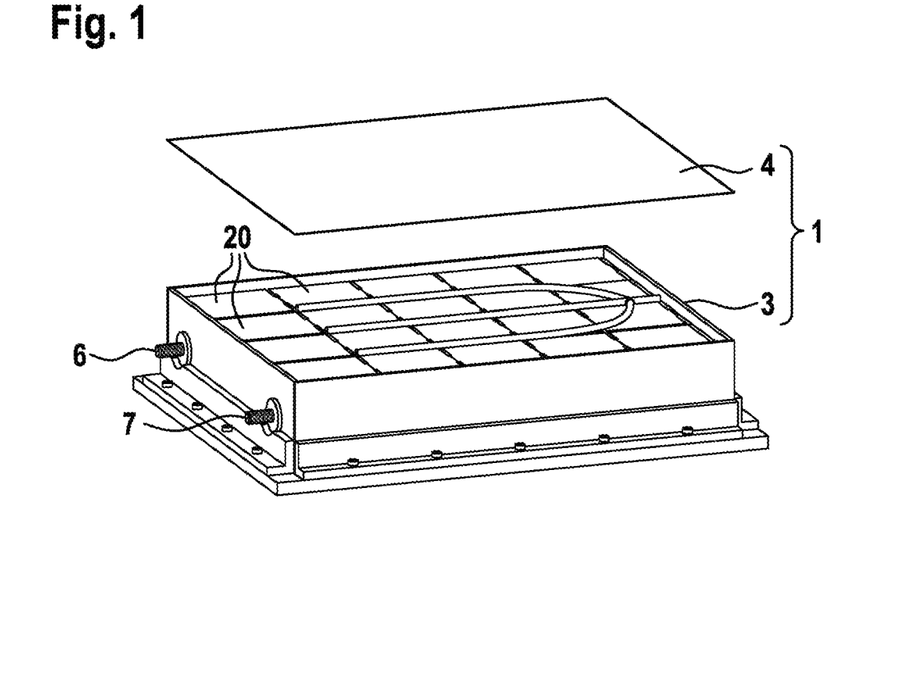
FIG. 1 a partially exploded perspective view of a battery pack including an array of pouch cells.
Figure 2:
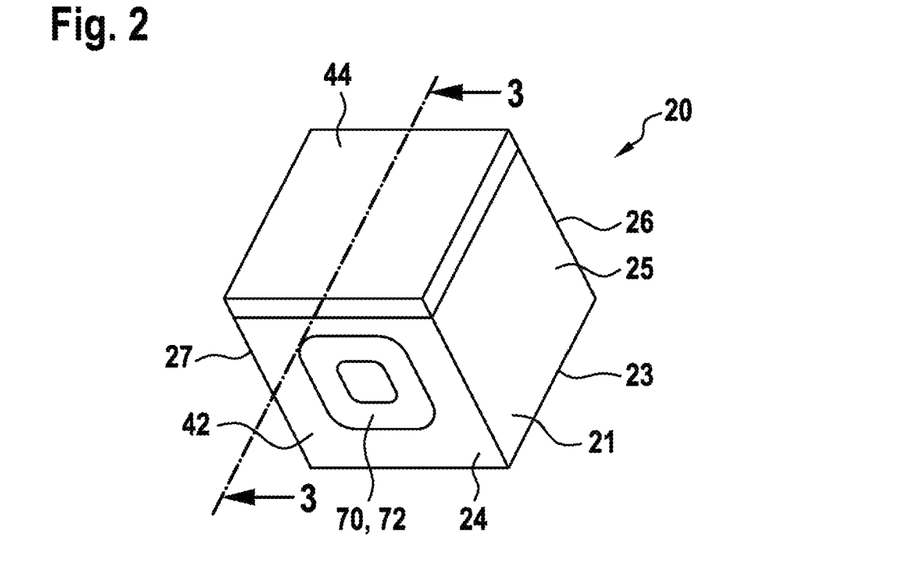
FIG. 2 is a perspective view of a pouch cell including the current collector devices.
Figure 3:
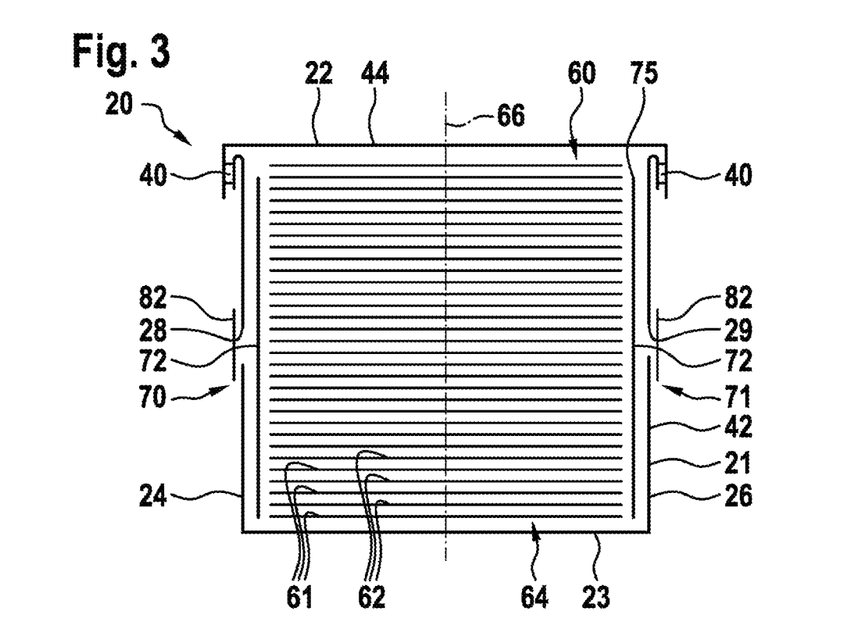
FIG. 3 is a schematic cross sectional view of the pouch cell of FIG. 2 as seen across line 3-3 of FIG. 2.

Referring to FIGS. 1-3, a battery pack 1 used to provide electrical power includes electrochemical cells 20 that are electrically interconnected and stored in an organized manner within a battery pack housing 2. The battery pack housing 2 includes a pack container portion 3 and a detachable pack lid 4. The cells 20 are lithium-ion pouch cells that include an electrode assembly 60 (FIGS. 3 and 4) that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery pack housing 2, the cells 20 are electrically connected in series or in parallel.

Each cell 20 includes a pouch-type cell housing 21. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The pouch-type cell housing 21 is an assembly of two blanks of a metal laminated polymer film sheet. Each blank is folded to form the shape of an open-ended box. The first blank corresponds to a relatively deep box that serves as a first cell housing portion or container 42 dimensioned to receive the electrode assembly 60. The container 42 includes a base corresponding to the cell housing second end 23, and a sidewall corresponding to the closed section defined by the cell housing sides 24, 25, 26, 27. The second blank corresponds to a relative shallow box that serves as a second housing portion or cover 44 that closes the open end of the container 42. The cover 44 corresponds to the cell housing first end 22, and is joined to each of the sides 24, 25, 26, 27 for example via welding. In particular, a continuous sealed joint 40 is formed along an intersection between the sides 24, 25, 26, 27 and the cell housing first end 22 to form a sealed rectangular pouch having a depth that is greater than the depth of some conventional pouch-type cell housings. For example, in some embodiments, the depth is greater than 20 mm. In the illustrated embodiment, the cell housing 21 is cube shaped and has length, width and height dimensions that are 90 mm or more.

The cell housing 21 includes openings 28, 29 formed in the cell housing sides 24, 26 that cooperate with a current collector devices 70, 71 to permit transfer of current out of the cell housing 21. The first opening 28 is formed in one of the sides, e.g. the first side 24, and the second opening 29 is formed in the opposed side, e.g. the third side 26. In addition, the first opening 28 and the second opening 29 are spaced apart from the sealed joint 40. For example, in the illustrated embodiment, the first opening 24 and the second opening 26 are each generally centered on the respective side 24, 26 whereas the sealed joint 40 adjoins the housing first end 22. By this arrangement, the first and second openings 28, 29 lie in a plane perpendicular to a plane defined by the cell housing second end 23 and thus face a stack axis 66 (discussed below) of the electrode assembly 60.

Figure 4:
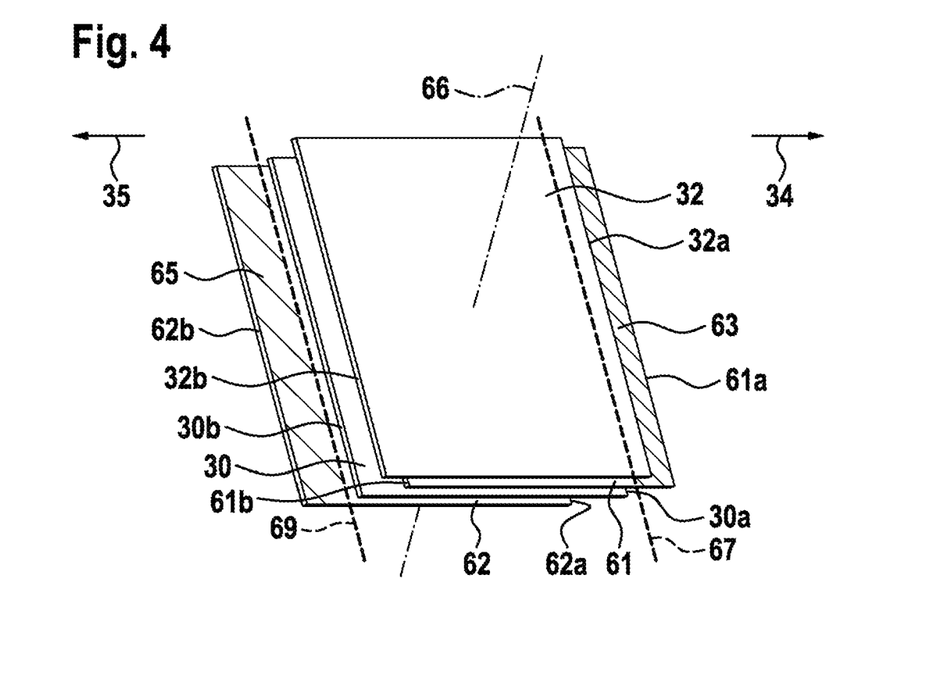
FIG. 4 is a perspective view of an electrode pair including a positive electrode plate, a negative electrode plate, and separator plates alternating with the positive and negative electrode plates.

Referring to FIGS. 3 and 4, the electrode assembly 60 is disposed in the cell housing 21 and includes a series of stacked positive electrode plates 61 alternating with negative electrode plates 62 and separated by intermediate separator plates 30, 32. The separator plates 30, 32 are each a permeable membrane that functions to keep the positive and negative electrodes 61, 62 apart to prevent electrical short circuits while also allowing passage of ionic charge carriers provided in the electrolyte and that are needed to close the circuit during the passage of current within the cell 20. The separator plates 30, 32 are formed of, for example, an electrically insulating material such as a tri-layer polypropylene-polyethylene-polypropylene membrane.

The series of stacked electrode plates 61, 62 and separator plates 30, 32 will be referred to herein as the "plate stack" 64, and a stack axis 66 of the plate stack 64 extends through a center of the plate stack 64 in a direction parallel to the stacking direction. When the electrode assembly 60 is disposed in the cell housing 21, the electrode plates 61, 62 are parallel to the cell housing first and second ends 22, 23 and the stack axis 66 extends in a direction perpendicular to the cell housing first and second ends 22, 23. The electrode plates 60, 61 are very thin (e.g., having a thickness on the order of about 0.095 to 0.145 mm) compared to the overall cell thickness (e.g. having a thickness on the order of tens or hundreds of mm) and thus are illustrated schematically in FIG. 3.

During stacking, the positive electrode plates 61, the negative electrode plates 62 and the separator plates 30, 32 that form the electrode assembly 60 are arranged in a layered or stacked configuration in the stacking direction. In the stacked configuration, the separator plates 30, 32, are stacked along the stack axis 66 such that peripheral edges of all the separator plates 30, 32 of the stack 64 are aligned in a direction parallel to the direction of the stack axis 66.

In addition, the positive and negative electrode plates 61, 62 are partially offset in a direction transverse to the stack axis (i.e., a length direction) relative to the respective separator plates 30, 32. In particular, the positive electrode plates 61 are stacked along the stack axis 66 such that peripheral edges of the positive electrode plates 61 are aligned with each other in a direction parallel to the direction of the stack axis 66 but are partially offset relative to the separator plates 30, 32 in a first direction parallel to the length direction. The first direction is represented in FIG. 4 by arrow 34. Thus, one edge 61a of each of the positive electrode plates 61 extends beyond a corresponding edge 30a, 32a of the separator plates 30, 32 resulting in a positive "clear lane" 63 of exposed conductive material.

The negative electrode plates 62 are stacked along the stack axis 66 such that peripheral edges of the negative electrode plates 62 are aligned with each other in a direction parallel to the direction of the stack axis 66 but are partially offset relative to the separator plates 30, 32, in a second direction, where the second direction is parallel to the length direction and opposed to that of the first direction. The second direction is represented in FIG. 4 by arrow 35. Thus, one edge 62b of each of the negative electrode plates 62 extends beyond a corresponding edge 30b, 32b of the separator plates 30, 32 resulting in a negative "clear lane" 65 of exposed conductive material.

Figure 5:
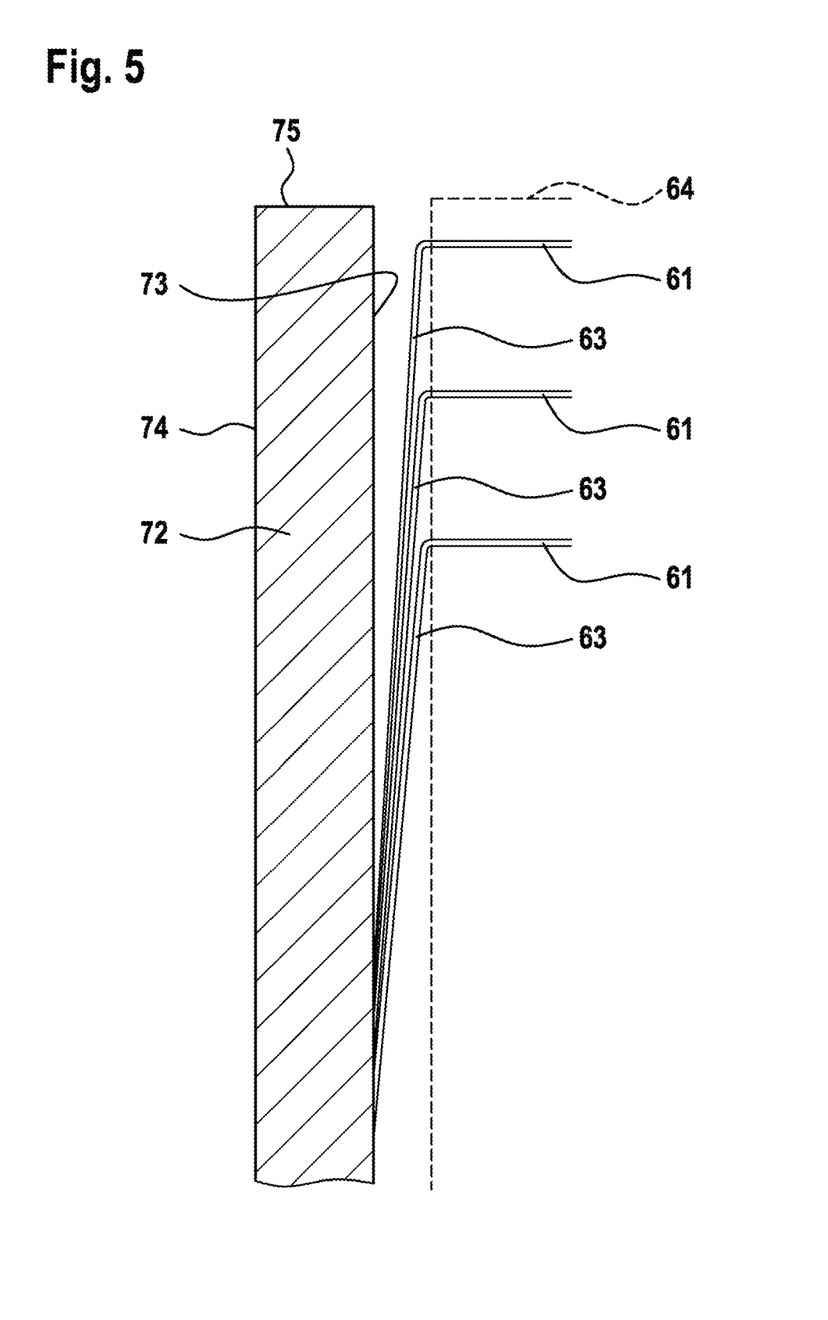
FIG. 5 is a cross-sectional view of the electrode plate stack illustrating the positive folded portions of the positive electrode plates arranged in an overlapped configuration and in electrical contact with a current collecting plate, with the negative electrode plates and separator plates omitted for clarity.

Referring to FIG. 5, the clear lane 63 of each positive electrode plate 61 may be folded against a side of the plate stack 64. Likewise, the clear lane 65 of each negative electrode plate 62 may be folded against the opposed side of the plate stack 64 (not shown). Due to the relative spacing of the electrode plates 61, 62 along the stack axis 66, the folded clear lanes 63, 65 form an overlapping louvered configuration in which a portion of each clear lane 63, 65 is exposed and faces a side (i.e., side 24) of the cell housing 21. The folded clear lanes on a given side of the plate stack 64 cooperate to form a generally planar electrically conductive surface that can be used to form an electrical connection with a current collection device 70, 71 as discussed further below.

Figure 6:
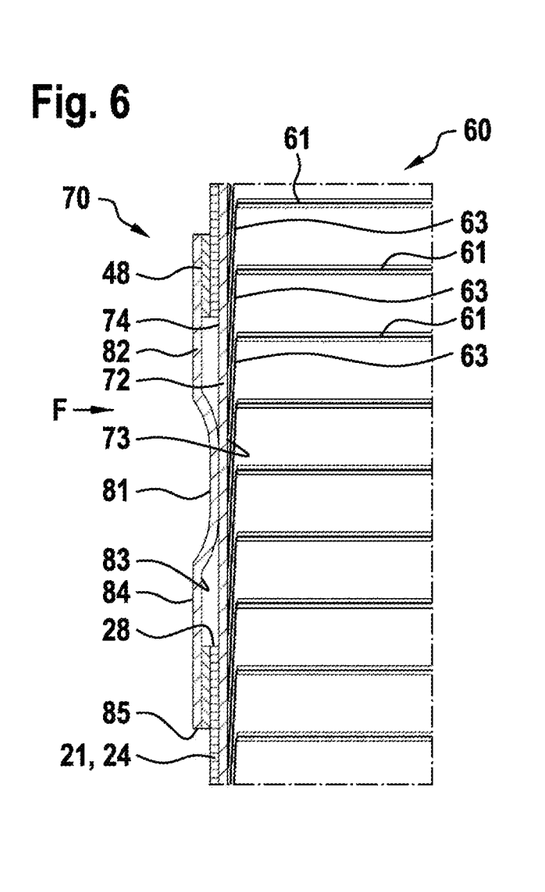
FIG. 6 is cross-sectional view of the current collector device as seen across line 5-5 of FIG. 2, with the negative electrode plates and separator plates omitted for clarity.

Referring to FIGS. 2, 3 and 6, each cell 20 also includes a first current collector device 70 and a second current collector device 71 that form a weld-free electrical connection with the plates 61, 62 of the plate stack 64. The first current collector device 70 is disposed at the first opening 28 and the second current collector device 71 is disposed at the second opening 29. The first current collector device 70 and the second current collector device 71 are identical, and thus only the first current collector device 70 will be described in detail. Elements common to both the first and second current collector devices 70, 71 will be referred to with common reference numbers.

The first current collector device 70 is a two-piece device that includes a current collecting plate 72 and a terminal plate 82. The current collecting plate 72 is a thin, electrically conductive plate that includes an electrode-facing surface 73, a side-facing surface 74 that is opposed to the electrode-facing surface 73, and a peripheral edge surface 75 that extends between the electrode-facing surface 73 and the side-facing surface 74. In the illustrated embodiment, the peripheral edge surface 75 defines a rectangular shape to correspond to the rectangular shape of a side of the electrode stack 64. Both of the electrode-facing surface 73 and the side-facing surface 74 are generally planar and free of surface features. In addition, the electrode-facing surface 73 and the side-facing surface 74 are dimensioned to have the same shape and nearly the same size as the facing side of the electrode plate stack 64. The current collecting plate 72 is disposed between the housing first side 24 and the electrode assembly 60. In particular, the electrode-facing surface 73 directly contacts and forms an electrical connection with the folded clear lanes 63 of the positive electrode plates 61. In addition, the current collecting plate 72 is oriented so that the side-facing surface 74 is parallel to the housing first side 24 and overlies the first opening 28. The cell housing 21 and the electrode assembly 60 are dimensioned so that the side-facing surface 74 of the collecting plate 72 abuts the inner surface of the housing first side 24 while also being in contact with the folded clear lanes 63 of the positive electrode plates 61.

The terminal plate 82 is a thin, electrically conductive plate that includes a housing-facing surface 83, an outward-facing surface 84 that is opposed to the housing-facing surface 83, and a peripheral edge surface 85 that extends between the housing-facing surface 83 and the outward-facing surface 84. In the illustrated embodiment, the peripheral edge surface 85 defines a generally rectangular shape, but is not limited to a generally rectangular shape. A central portion 81 of the terminal plate 82 is slightly offset relative to the periphery, and thus each of the housing-facing surface 83 and the outward-facing surface 84 are slightly non-planar. In particular, in the central region 81, the housing-facing surface 83 is bulged while the outward-facing surface 84 is depressed. The terminal plate 82 is disposed outside the cell housing 21 and abuts the outer surface of the housing first side 24 so as to overlie the first opening 28. The terminal plate 82 is oriented so that the housing-facing surface 83 is parallel to the housing first side 24, and faces the current collecting plate 72 through the first opening 28. In addition, the terminal plate 82 is positioned so that the bulge of the central portion 81 protrudes into the first opening 28 and abuts the current collecting plate 72, whereby a direct electrical connection is formed between the current collecting plate 72 and the terminal plate 82.

A bead 48 of sealing material is provided around the opening 28 to form a hermetic seal and prevent leakage of electrolyte from the cell housing 21 through the opening 28. In the illustrated embodiment, the bead 48 is provided between the terminal plate housing-facing surface 83 and the housing first side 24. It is understood that the bead 48 could alternatively be provided between the current collecting plate side-facing surface 74 and the housing first side 24, or at both locations. Advantageously, since the sealing material is used at a location remote from the seal joint 40, it requires fewer specialized material properties. For this reason, the sealing material used to provide the bead 48 may be a commonly available material. The sealing material may be, for example, a pressure sensitive adhesive or a gasket material. As a result, the sealing material may be low in cost relative to some sealing materials used in some conventional pouch cells to form a seal within the seal joint.

The second current collector device 71 is disposed at the second opening 29 (FIG. 3). The current collecting plate 72 of the second current collector device 71 is disposed between the housing third side 26 and the electrode assembly 60, and is oriented so that the side-facing surface 74 is parallel to the housing third side 26 and overlies the second opening 29. In addition, electrode-facing surface 73 of the second current collector device 71 directly contacts and forms an electrical connection with the folded clear lanes 65 of the negative electrode plates 62, while the side-facing surface 74 abuts an inner surface of the cell housing third side 26. In addition, the terminal plate 82 of the second current collector device 71 is disposed outside the cell housing 21 and abuts an outer surface of the housing third side 26 so as to overlie the second opening 29. The terminal plate 82 is oriented so that the housing-facing surface 83 is parallel to the housing third side 26, and faces the current collecting plate 72 through the second opening 29. In addition, the terminal plate 82 is positioned so that the bulge of the central portion 81 protrudes into the second opening 29 and abuts the current collecting plate 72, whereby a direct electrical connection is formed between the current collecting plate 72 and the terminal plate 82.

In both the first current collector device 70 and the second current collector device 71, a direct electrical connection is formed between the current collecting plate 72 and the terminal plate 82 via direct contact between the bulged central portion 81 of the terminal plate 82 with the side facing surface 74 of the current collecting plate 72. In particular, a weld-free, direct electrical connection is formed between the side-facing surface 74 of the current collecting plate 72 and the housing-facing surface of the terminal plate 82 in the vicinity of the opening 28, 29. In order to ensure that an electrical connection is formed between the facing surfaces 83, 74 of the terminal plate 82 and the current collecting plate 72, an external force may optionally be provided. For example, a force F (represented by an arrow in FIG. 6) is applied to outward-facing surface 84 of the terminal plate 82 that urges the terminal plate 82 into direct contact with the current collecting plate 72 via the opening 28, 29. The force F may be applied to the outward-facing surface 84 by, for example, a spring (not shown) or by an adjacent cell 20, as discussed further below.

Figure 7:
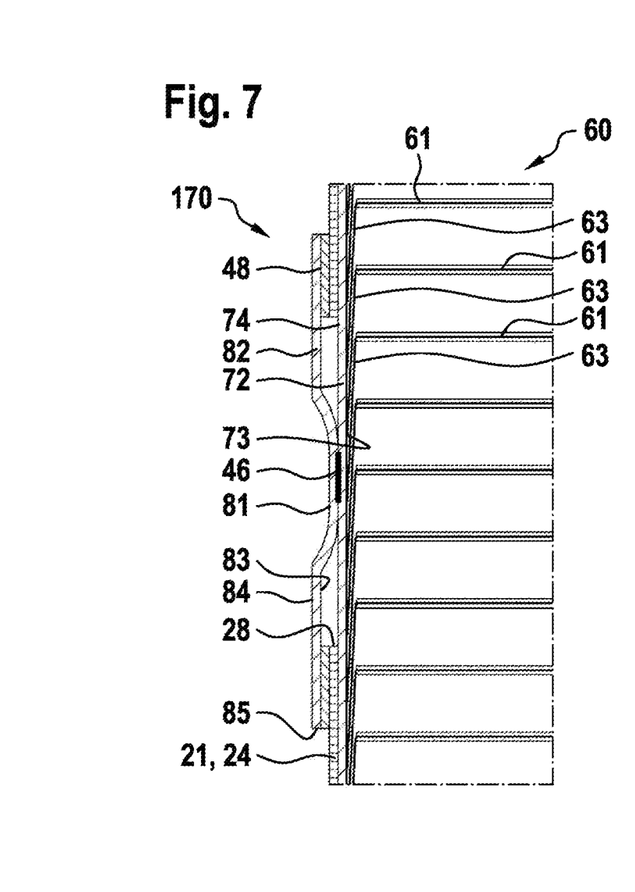
FIG. 7 is cross-sectional view of an alternative embodiment current collector device, with the negative electrode plates and separator plates omitted for clarity.

Referring to FIG. 7, an alternative embodiment current collector device 170 includes a welded connection between the current collecting plate 72 and the terminal plate 82. For example, the current collecting plate 72 may be welded to the terminal plate 82 via resistance welding, ultrasonic welding or other methods, with the weld passing through the opening 28, 29 in order to ensure a reliable electrical connection between these elements.

Figure 8:
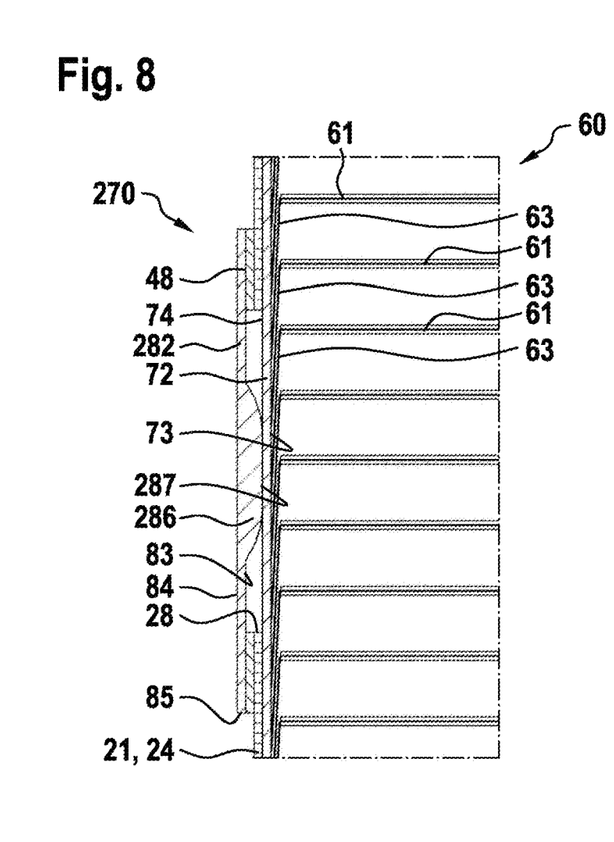
FIG. 8 is cross-sectional view of another alternative embodiment current collector device, with the negative electrode plates and separator plates omitted for clarity.

Referring to FIG. 8, another alternative embodiment current collector device 270 is similar to the current collector device 70 described above with respect to FIG. 6, and common elements are referred to using common reference numbers. The current collector device 270 includes the current collecting plate 72 and a terminal plate 282 that is modified relative to the earlier disclosed terminal plate 82. In particular, the terminal plate 282 includes a protrusion 286 that is formed on the housing-facing surface 83 and extends toward the current collecting plate 72. The protrusion 286 is provided at a location corresponding to the opening 28, 29. In addition, the protrusion 286 has a height that corresponds to the sum of the thickness of the cell housing 21 and the bead 48 of sealant material, and thus is configured to protrude through the opening 28, 29, directly contact the current collecting plate 72 and form an electrical connection with the current collecting plate 72. The protrusion 286 terminates in a flat contact surface 287 to maximize the contact area between the contact surface 287 and the current collecting plate 72. In the illustrated embodiment, the protrusion 286 has a circular cross-sectional shape, but is not limited to having this shape. As in the earlier embodiments, the bead 48 of sealing material is provided on the housing-facing surface 83 of the terminal plate 282 around the opening 28, 29 to form a hermetic seal and prevent leakage of electrolyte from the cell housing 21. In the illustrated embodiment, the electrical connection between the terminal plate 282 and the current collecting plate 72 is a weld-free, direct electrical connection.

Figure 9:
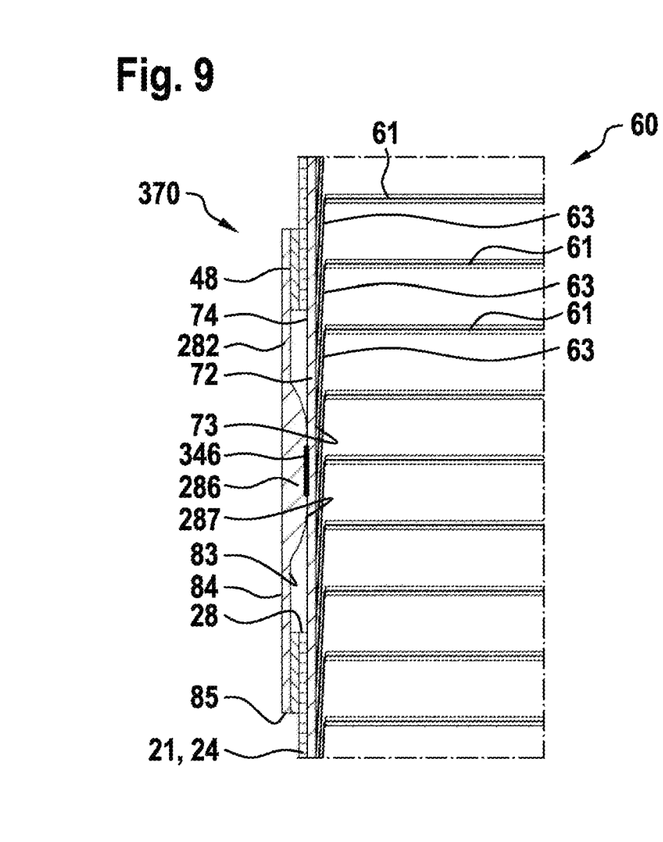
FIG. 9 is cross-sectional view of another alternative embodiment current collector device, with the negative electrode plates and separator plates omitted for clarity.

Referring to FIG. 9, an alternative embodiment current collector device 370 includes a welded connection 346 between the current collecting plate 72 and the terminal plate 282. For example, the current collecting plate 72 may be welded to the terminal plate 282 via resistance welding, ultrasonic welding or other methods, with the weld passing through the opening 28, 29 in order to ensure a reliable electrical connection between these elements.

Figure 10:
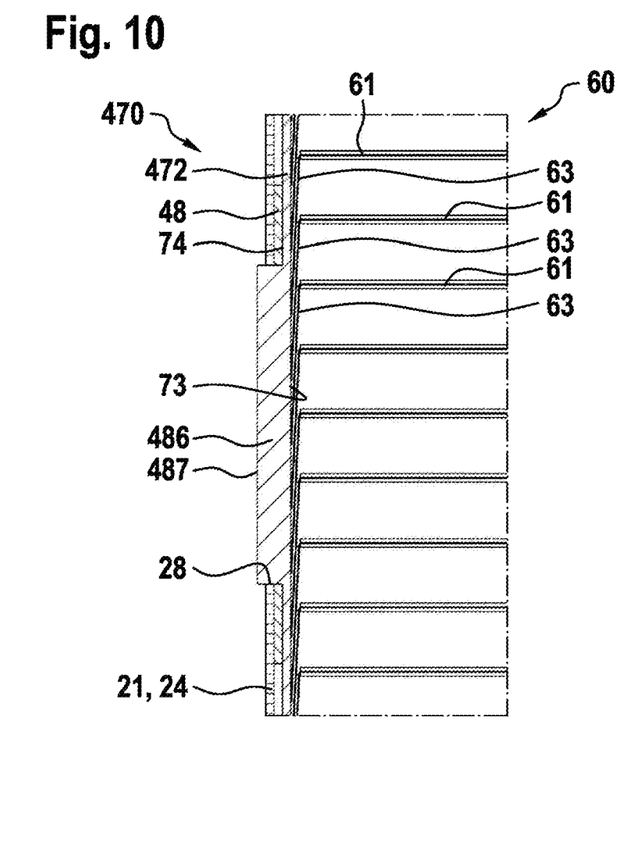
FIG. 10 is cross-sectional view of an alternative embodiment current collector device, with the negative electrode plates and separator plates omitted for clarity.
Figure 11:
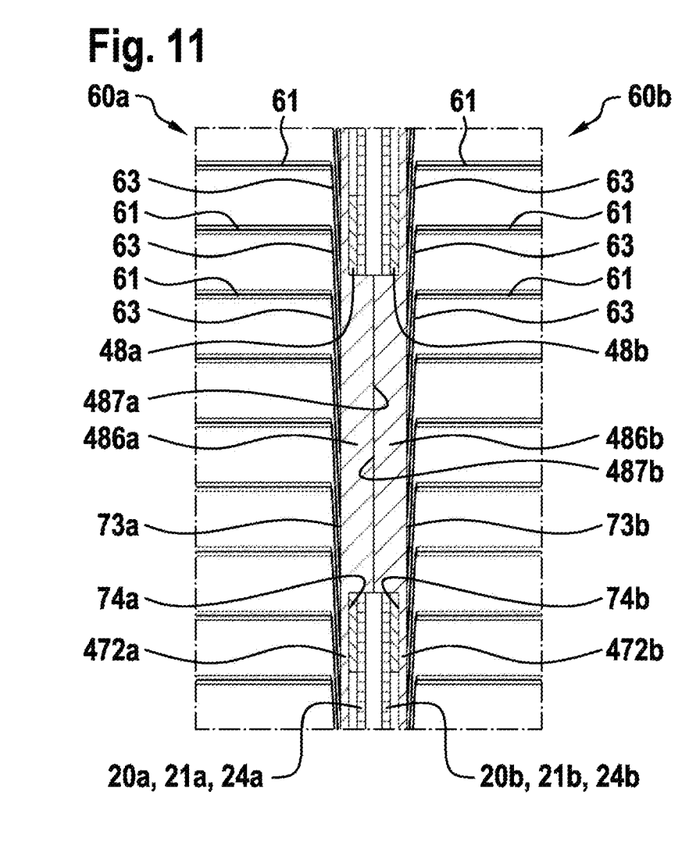
FIG. 11 is a cross-sectional view of an electrical connection formed between adjacent pouch cells, each pouch cell including the current collector device of FIG. 9, with the negative electrode plates and separator plates omitted for clarity.

Referring to FIGS. 10 and 11, another alternative embodiment current collector device 470 is similar to the current collector device 70 described above with respect to FIG. 6, and common elements are referred to using common reference numbers. The current collector device 470 is a one-piece element that includes only a current collector plate 472 that is modified relative to the earlier disclosed current collector plate 72. The current collector plate 472 includes a protrusion 486 that is formed on the side-facing surface 74 and extends toward the side 22, 26 of the cell housing 21. The protrusion 486 is provided at a location corresponding to the opening 28, 29. In addition, the protrusion 486 has a height that corresponds to, or is slightly greater than, the sum of the thickness of the cell housing 21 and the bead 48 of sealant material, and thus is configured to protrude through the opening 28, 29. By this configuration, the protrusion 486a of one cell 20a can form a direct electrical connection with a protrusion 486b of an adjacent cell 20b. The protrusion 486 terminates in a flat contact surface 487 to maximize the contact area between the contact surface 487 and an external structure such as an adjacent protrusion 486b. In the illustrated embodiment, the protrusion 486 has a generally rectangular cross-sectional shape, but is not limited to having this shape. As in the earlier embodiments, the bead 48 of sealing material is provided on the side-facing surface 74 of the current collector plate 472 that surrounds the opening 28, 29 to form a hermetic seal and prevent leakage of electrolyte from the cell housing 21.

Figure 12:
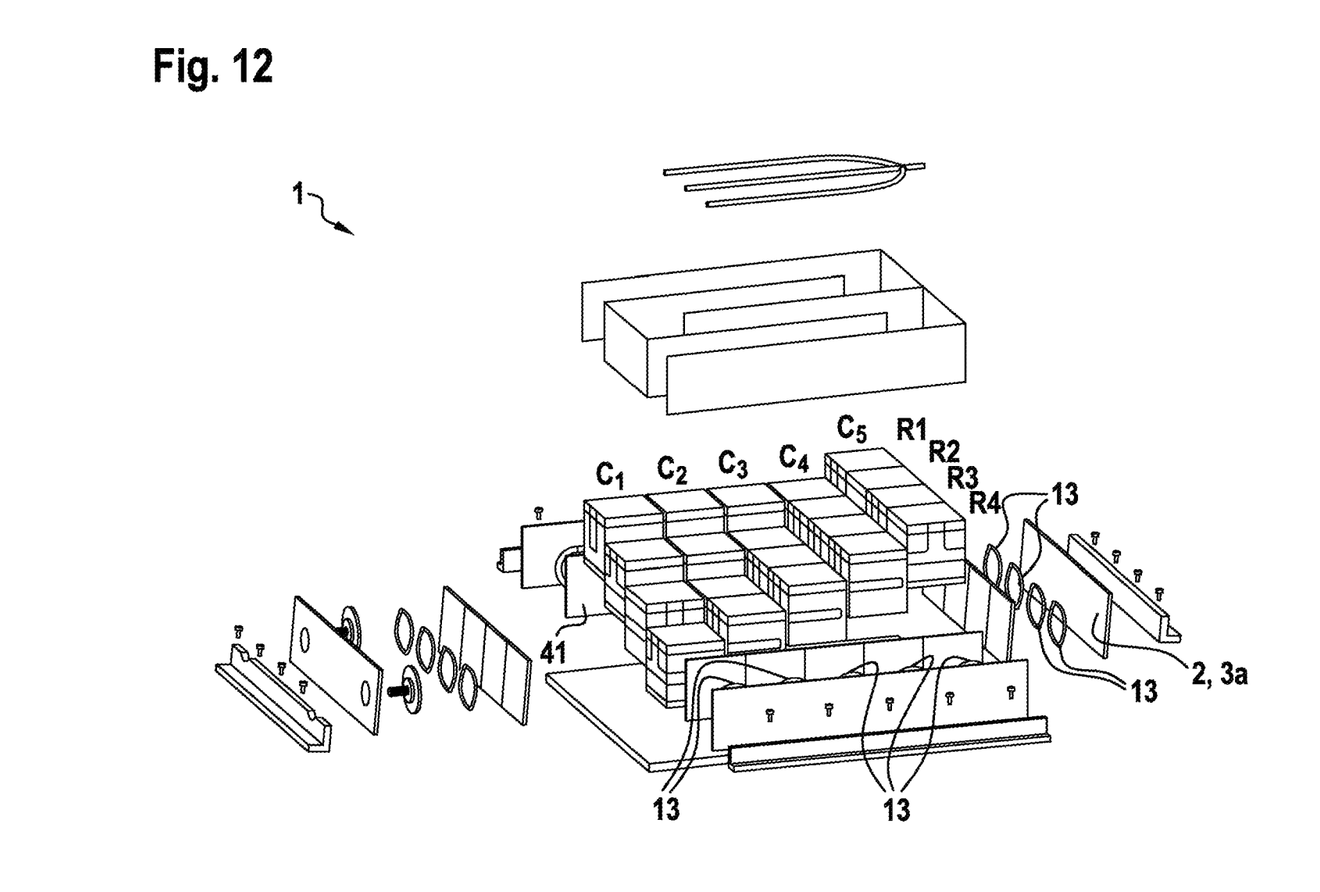
FIG. 12 a partially exploded perspective view of a battery pack including an array of pouch cells.

Referring now to FIG. 12, the force F that optionally provides the direct contact, for example between the current collecting plate 72 and the terminal plate 82 within each current collector device 70, 71, or between the protrusions 486a, 486b of adjacent cells 20a, 20b, may be generated externally with respect to the cell housing 20. FIG. 12 illustrates the battery pack 1 including an array of cells 20 arranged in rows R1, R2, R3, R4 and columns C1, C2, C3, C4, C5 within the battery pack housing 2. The electrical connection between the current collecting plate 72 and the terminal plate 82 within each current collector device 70, 71, or between the protrusions 486a, 486b of adjacent cells 20a, 20b, is generated and/or assured by urging the cells 20 of a row together and the cells 20 of a column together. Specifically, a compression force along the cell rows is achieved by providing an elastic member 13 between the cells 20 of the row and the sidewall 3a of the container portion 3 of the battery pack housing 2. For example, an elastic member such as the wave spring 13 can be disposed at one or both ends of each row R1, R2, R3, R4 to ensure an electrical connection between the current collecting plate 72 and the terminal plate 82 within each current collector device 70, 71 of the row, or between the protrusions 486a, 486b of adjacent cells 20a, 20b of the row. Similarly, a wave spring 13 can be disposed at one or both ends of each column C1, C2, C3, C4, C5 to ensure an electrical connection between the current collecting plate 72 and the terminal plate 82 within each current collector device 70, 71 of the column, or between the protrusions 486*a*, 486*b* of adjacent cells 20*a*, 20*b* of the column. In other embodiments, the elastic member 13 may alternatively be disposed between adjacent cells 20*a*, 20*b* along the rows and columns to ensure that an electrical is formed within each current collector device 70, 71.

In some embodiments, the current collecting plate 72 and the terminal plate 82 of the first collector device 70 are formed of, or plated with, a first electrically conductive material that corresponds to the material used to form the positive electrode plates 61, such as aluminum. In addition, the current collecting plate 72 and the terminal plate 82 of the second collector device 71 are formed of, or plated with, a second electrically conductive material that corresponds to the material used to form the negative electrode plates 62, such as copper.

Figure 13:
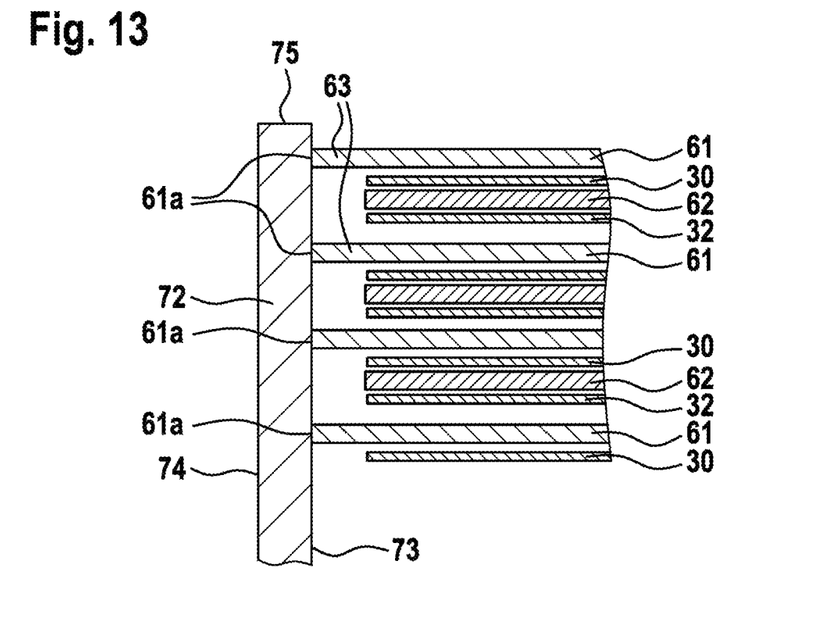
FIG. 13 is a partial cross sectional view of an alternative embodiment electrode stack.

Referring to FIG. 13, although the current collecting plate 72 of the first current collecting device 70 and the second current collecting device 71 are described above as being pressed against a folded portion (e.g., the clear lane 63, 65) of the corresponding positive or negative electrode plate 61, 62 to form the weld-free electrical connection, other connection configurations may be employed to form the weld-free electrical connection. For example, the current collecting plate 72 of the first current collecting device 70 may be electrically connected via direct contact to peripheral edges 61*a* of non-folded positive electrode plates 61. Similarly, the current collecting plate 72 of the second current collecting device 71 may be electrically connected via direct contact to the peripheral edges 62*b* of non-folded negative electrode plates 62. Thus, the first and second current collector devices 70, 71 may form a direct electrical connection with edge surfaces of the electrode plates 61, 62 via a weld-free pressure contact.

Referring to FIGS. 14-18, the location and arrangement of the openings 28, 29 formed in the cell housing can affect overall cell storage capacity since current density is localized at the openings 28, 29. This is because cell regions having a high current density tend to age more quickly than other regions of lower current density, thus reducing cell storage capacity. Thus, for a given side (i.e., side 24) of the cell housing 21, it can be beneficial to provide the opening 28 as one or more openings arranged in such a way as to minimize current density at any one location and/or to more evenly distribute current density across a side of the cell 20. However, the benefits of reducing current density at any one location have to be balanced with the technical challenges associated with ensuring that the cell housing 21 is sealed along a perimeter of the opening 28 to prevent leakage of electrolyte from the cell 20 and moisture entry into the cell 20. These challenges are minimized by minimizing a total length of the peripheral edge of the opening or openings in the cell housing 21.

Figure 14:
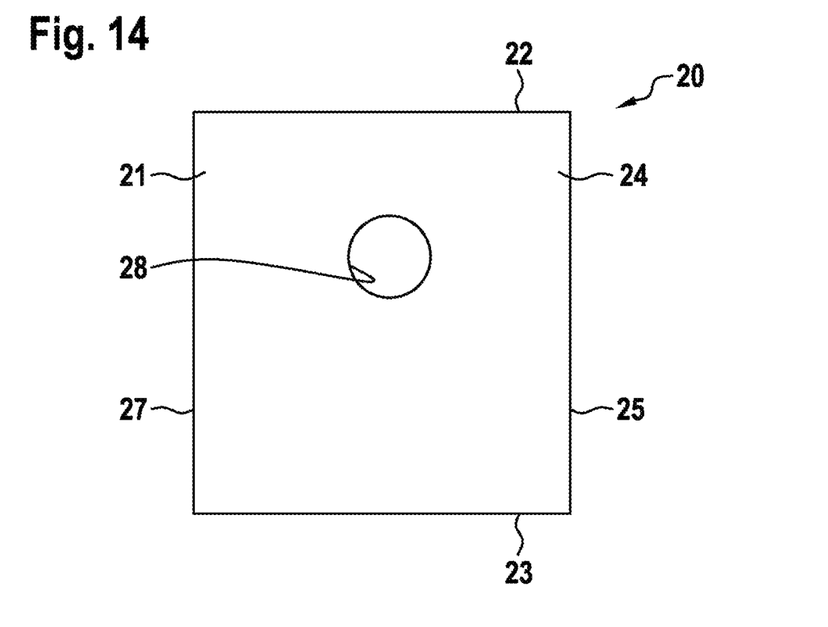
FIG. 14 is a side view of the cell illustrating an exemplary opening in the side of the cell.

Referring to FIG. 14, in one exemplary embodiment, there is a single cell opening 28, 29 (only opening 28 is shown) disposed on a corresponding cell side 24, 26. The cell opening 28 is circular in shape. In the illustrated embodiment, the opening 28 is located closer to the housing first end 22 than the housing second end 23, but the opening 28 is not limited to this location. Although a circular shape is illustrated, it is understood that the opening 28 could have a polygonal or an irregularly curved shape (i.e., a kidney shape).

Figure 15:
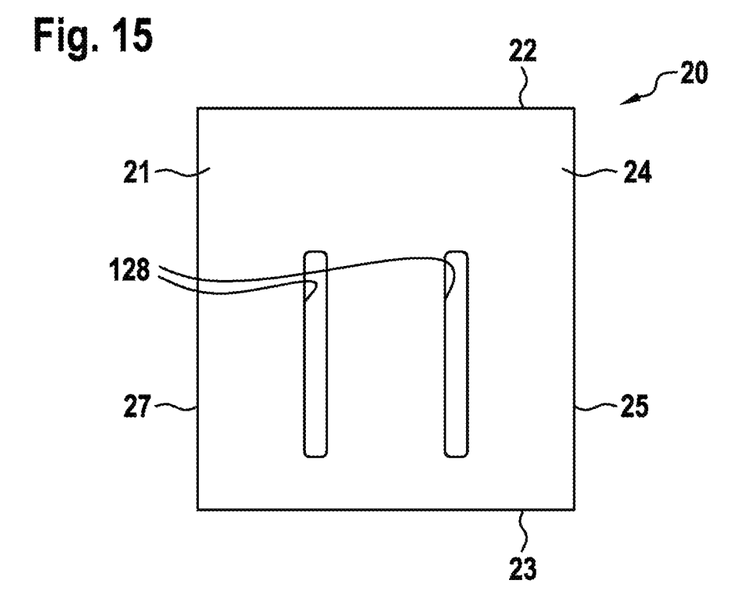
FIG. 15 is a side view of the cell illustrating another exemplary opening in the side of the cell.

Referring to FIG. 15, in another exemplary embodiment, there are multiple, mutually spaced cell openings 128, 129 (only openings 128 are shown) on each side 24, 26. In the illustrated embodiment, there are two elongated openings 128 that are generally rectangular in shape. The openings 128 are arranged so that long axes of the openings 128 extend in parallel to each other and are oriented to extend between the first and second ends 22, 23 of the cell housing 21. Although a generally rectangular shape is illustrated, it is understood that the openings 128 could have rounded ends or have an oval, or other, elongated shape.

Figure 16:
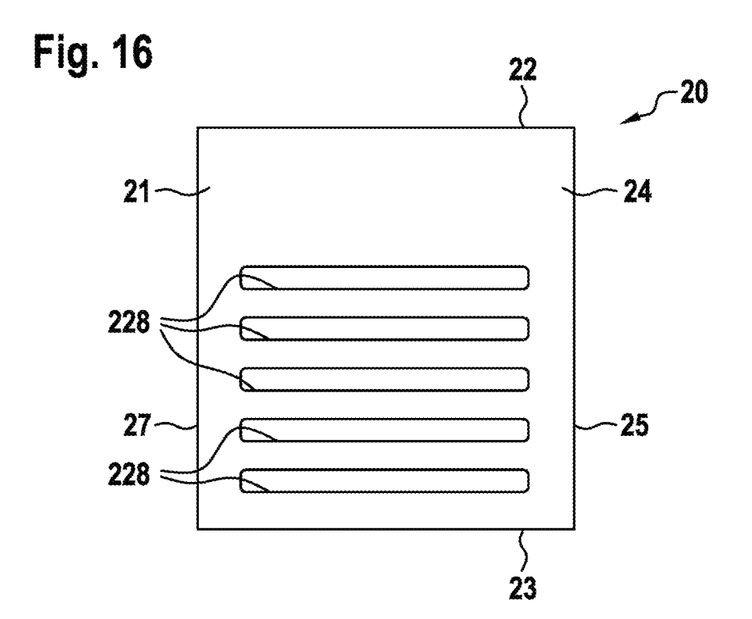
FIG. 16 is a side view of the cell illustrating another exemplary opening in the side of the cell.

Referring to FIG. 16, in another exemplary embodiment, there are multiple, mutually spaced cell openings 228, 229 (only openings 228 are shown) on each side 24, 26. In the illustrated embodiment, there are five elongated openings 228 that are generally rectangular in shape. The openings 228 are arranged so that long axes of the openings 228 extend in parallel to each other and are oriented to extend between the second and fourth sides 25, 27 of the cell housing 21. Although a generally rectangular shape is illustrated, it is understood that the openings 228 could have rounded ends or have an oval, or other, elongated shape.

Figure 17:
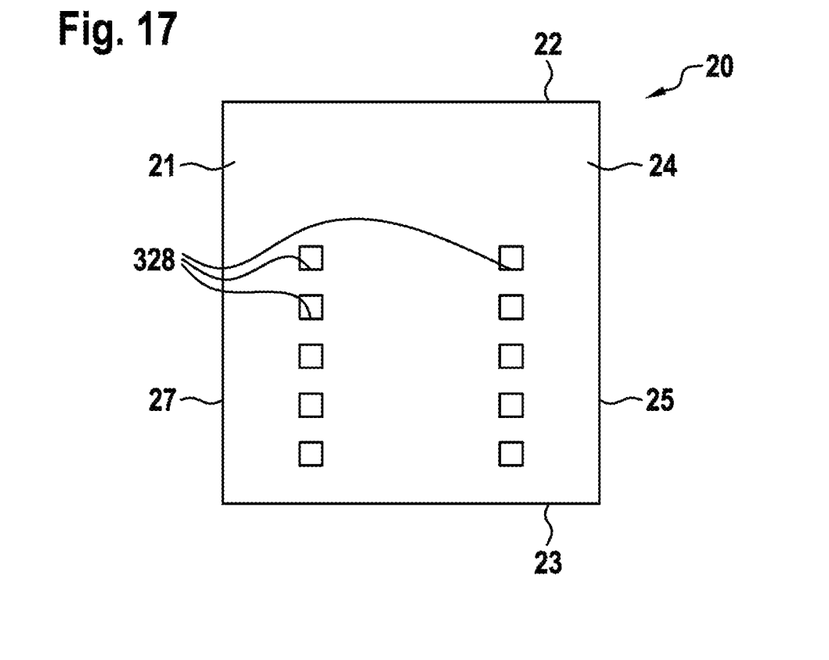
FIG. 17 is a side view of the cell illustrating another exemplary opening in the side of the cell.

Referring to FIG. 17, in another exemplary embodiment, there are multiple, mutually spaced cell openings 328, 329 (only openings 328 are shown) on each side 24, 26. In the illustrated embodiment, there are two rows of five openings 228 that are generally square in shape. The rows are arranged in parallel and so that axes parallel to the rows are oriented to extend between the first and second ends 22, 23 of the cell housing 21. Although a generally square shape is illustrated, it is understood that the openings 228 could have a circular or other polygonal shape. It is also understood that the rows could alternatively extend between the second and fourth sides 25, 27 of the cell housing 21 or in a diagonal orientation.

Figure 18:
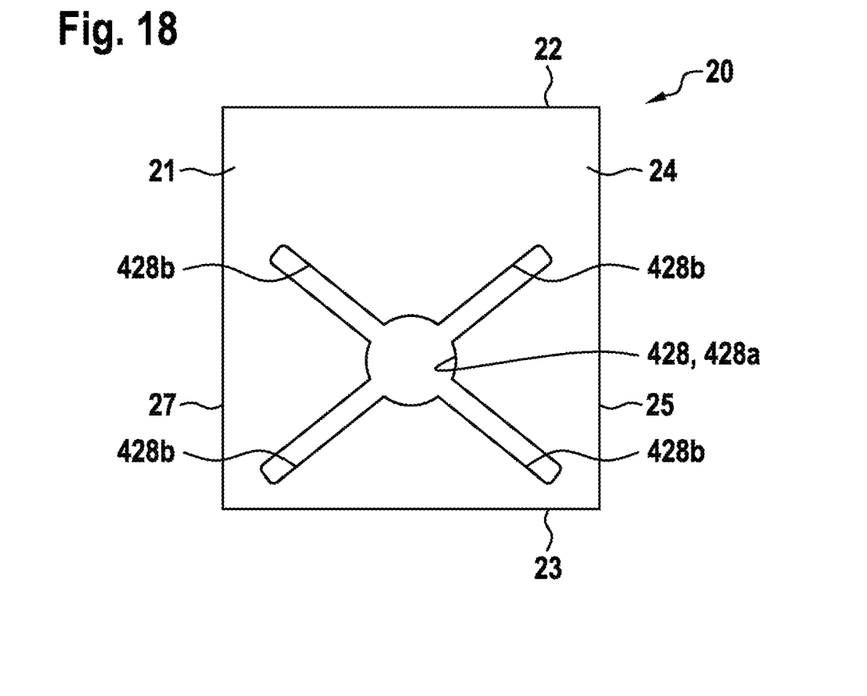
FIG. 18 is a side view of the cell illustrating yet another exemplary opening in the side of the cell.

Referring to FIG. 18, in yet another exemplary embodiment, there is a single cell opening 428, 429 (only opening 428 is shown) disposed on a corresponding cell side 24, 26, and the cell openings 428, 429 are irregular in shape. In the illustrated embodiment, the opening 428 includes a circular central portion 428*a* with elongated slots 428*b* extending radially outward from the central portion 428*a*.

In the embodiment illustrated in FIG. 6, the central portion 81 of the terminal plate 82 is bulged and protrudes through the opening 28 to form an electrical connection with the current collecting plate 72. It is understood that in some alternative embodiments, the central portion of the current collecting plate 72 may be bulged rather than the central portion of the terminal plate 82. In still other alternative embodiments, both the terminal plate 82 and the current collecting plate 72 may be substantially planar (e.g., bulge-free and protrusion-free), and the force F may be applied to outward-facing surface 84 of the terminal plate 82 to urge the terminal plate 82 into direct contact with the current collecting plate 72 via the opening 28, 29.

In the illustrated embodiments, the cell housing 21 is described as having the first opening 28 that is formed in one of the sides and the second opening 29 that is formed in a side that is opposed to the one side. However, the cell housing 21 is not limited to this configuration. For example, in some embodiments, the cell housing 21 may include the first opening 28 that is formed in one of the sides and the second opening 29 that is formed in side that is adjacent to the one side. In other embodiments, the cell housing 21 may include two first openings 28 where one first opening 28 is disposed on each of opposed sides, and two second openings 29 where one second opening is disposed on each of the sides adjacent to the opposed sides.

Although the electrode assembly 60 is described herein as being a "stacked" electrode assembly that includes a series of stacked plates 61, 62, the electrode assembly 60 is not limited to this configuration. For example, in some embodiments, the electrode assembly 60 may include a rolled electrode assembly (e.g., a jelly roll assembly), a folded electrode assembly (i.e., a Z-fold assembly), or other electrode arrangement.

Although the cell 20 has a cube-shaped cell housing 21, the cell housing 21 is not limited to a cube shape. For example, the cell housing 21 may be rectangular in shape (FIG. 4). In another example, the cell housing 21 may have other polygonal shapes that permit close packing such as an eight surface structure having hexagonally arranged sides (not shown).

Moreover, the cells 20 are not limited to being a lithium-ion battery. For example, the cells 20 may be aluminum-ion, alkaline, nickel-cadmium, nickel metal hydride, or other type of cell.

Selective illustrative embodiments of the battery system including the cell are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system and battery cell have been described above, the battery system and/or battery cell are not limited to the working examples described above, but various design alterations may be carried out without departing from the devices as set forth in the claims.

What is claimed is:

1. An electrochemical cell including
an electrically-neutral cell housing formed of a flexible metal laminated polymer film sheet, the cell housing having a first housing portion, and a second housing portion that is joined to the first housing portion along a sealed joint to form a pouch,
an electrode assembly disposed in the cell housing, the electrode assembly including positive electrode portions alternating with negative electrode portions, the positive electrode portions and the negative electrode portions being separated by at least one separator and stacked along a stack axis, and
a current collector device that is electrically connected to one of the positive electrode portions and the negative electrode portions and exits the cell housing via an opening formed in the cell housing, wherein
the first housing portion comprises a base and a sidewall that protrudes from a perimeter of the base and surrounds the base to form an open-ended container,
the stack axis extends in a direction perpendicular to the base,
the opening is formed in the sidewall at a location spaced apart from the sealed joint and at a location facing the stack axis, and
the current collector device includes
a current collecting plate that is disposed between the sidewall and the one of the positive electrode portions and the negative electrode portions, is electrically connected to the one of the positive electrode portions and the negative electrode portions, is oriented parallel to the sidewall, and overlies the opening and,
a terminal plate that is oriented parallel to the sidewall, overlies the opening and is disposed outside the cell housing, the terminal plate directly contacting the current collecting plate via the opening so as to form an electrical connection with the current collecting plate.

2. The electrochemical cell of claim 1, wherein a force is applied to the terminal plate that urges the terminal plate into direct contact with the current collecting plate.

3. The electrochemical cell of claim 1, wherein the terminal plate and the current collecting plate form a weld-free electrical connection.

4. The electrochemical cell of claim 1, wherein the current collecting plate is welded to the terminal plate, and the weld is positioned in the opening.

5. The electrochemical cell of claim 1, further comprising a second current collector that is electrically connected to another one of the positive electrode portions and the negative electrode portions and exits the cell housing via a second opening formed in the cell housing.

6. The electrochemical cell of claim 5, wherein
the cell housing is rectangular including a first end, an opposed second end, and four sides that extend between the first end and the second end, and
the first opening is formed in one of the four sides, and the second opening is formed in another of the four sides.

7. The electrochemical cell of claim 6, wherein the first opening is formed in one of the four sides, and the second opening is formed in a side opposed to the one of the four sides.

8. The electrochemical cell of claim 6, wherein the first opening is formed in one of the four sides, and the second opening is formed in a side adjacent to the one of the four sides.

9. The electrochemical cell of claim 1, wherein one of the terminal plate and the current collecting plate includes a protrusion that protrudes through the opening toward the other of the terminal plate and the current collecting plate and forms an electrical connection with the other of the terminal plate and the current collecting plate.

10. The electrochemical cell of claim 1, wherein the current collector device includes a seal that surrounds the opening, and the seal is disposed between the sidewall and one of the terminal plate and the current collecting plate.

11. The electrochemical cell of claim 1, wherein the current collector device consists of the current collecting plate and the terminal plate.

12. An electrochemical cell including
a cell housing formed of a flexible sheet, the cell housing having a first housing portion, and a second housing portion that is joined to the first housing portion along a sealed joint to form a pouch,
an electrode assembly disposed in the cell housing, the electrode assembly including positive electrode portions alternating with negative electrode portions, the positive electrode portions and the negative electrode portions being separated by at least one separator and stacked along a stack axis, and
a current collector device that is electrically connected to one of the positive electrode portions and the negative electrode portions and exits the cell housing via an opening formed in the cell housing, wherein
the first housing portion comprises a base and a sidewall that protrudes from a perimeter of the base and surrounds the base to form an open-ended container,
the stack axis extends in a direction perpendicular to the base,
the opening is formed in the sidewall at a location spaced apart from the sealed joint and at a location facing the stack axis, and the current collector device includes
- a current collecting plate that is planar and is disposed between the sidewall and the one of the positive electrode portions and the negative electrode portions, is electrically connected to the one of the positive electrode portions and the negative electrode portions, is oriented parallel to the sidewall, and overlies the opening and,
- a terminal plate that is planar and oriented parallel to the sidewall, overlies the opening and is disposed outside the cell housing, the terminal plate directly contacting the current collecting plate via the opening so as to form an electrical connection with the current collecting plate, wherein each of the terminal plate and the current collecting plate comprise a first side and an opposed second side,
each of the first side and the second side is generally planar, and
the terminal plate directly contacts the current collecting plate upon application of an external force to the terminal plate.

13. An electrochemical cell including
an electrically-neutral cell housing formed of a flexible metal laminated polymer film sheet, the cell housing having a first housing portion, and a second housing portion that is joined to the first housing portion along a sealed joint to form a pouch,
- an electrode assembly disposed in the cell housing, the electrode assembly including positive electrode portions alternating with negative electrode portions, the positive electrode portions and the negative electrode portions being separated by at least one separator and stacked along a stack axis,
- a current collector device that is electrically connected to one of the positive electrode portions and the negative electrode portions and exits the cell housing via an opening formed in the cell housing, wherein
- the first housing portion comprises a base and a sidewall that protrudes from a perimeter of the base and surrounds the base to form an open-ended container,
- the stack axis extends in a direction perpendicular to the base,
- the opening is formed in the sidewall at a location spaced apart from the sealed joint and at a location facing the stack, and
- the current collector device consists of a current collecting plate that is
  - disposed between the sidewall and the one of the positive electrode portions and the negative electrode portions,
  - electrically connected to the one of the positive electrode portions and the negative electrode portions,
  - oriented parallel to the sidewall and positioned so as to overlie the opening, and includes a protrusion that extends through the opening and forms a terminal.

14. The electrochemical cell of claim 13, wherein the protrusion terminates in a planar surface.

15. The electrochemical cell of claim 13, further comprising a second current collector device that is electrically connected to another one of the positive electrode portions and the negative electrode portions and exits the cell housing via a second opening formed in the cell housing.

16. A battery pack comprising electrochemical cells, each electrochemical cell including
- a cell housing formed of a flexible metal laminated, polymer film sheet, the cell housing having a first housing portion, and a second housing portion that is joined to the first housing portion along a sealed joint to form a pouch,
- an electrode assembly disposed in the cell housing, the electrode assembly including positive electrode portions alternating with negative electrode portions, the positive electrode portions and the negative electrode portions being separated by at least one separator and stacked along a stack axis, and
- a current collector device that is electrically connected to one of the positive electrode portions and the negative electrode portions and exits the cell housing via an opening formed in the cell housing, wherein
- the first housing portion comprises a base and a sidewall that protrudes from a perimeter of the base and surrounds the base to form an open-ended container,
- the stack axis extends in a direction perpendicular to the base,
- the opening is formed in the sidewall at a location spaced apart from the sealed joint and at a location facing the stack, and
- a portion of the current collector device of one of the electrochemical cells directly contacts and forms an electrical connection with a portion of a current collector device of an adjacent electrochemical cell.

17. The battery pack of claim 16, wherein the current collector device includes
- a current collecting plate that is disposed between the sidewall and the one of the positive electrode portions and the negative electrode portions, is electrically connected to the one of the positive electrode portions and the negative electrode portions, is oriented parallel to the sidewall, and overlies the opening and,
- a terminal plate that is oriented parallel to the sidewall, overlies the opening and is disposed outside the cell housing, the terminal plate directly contacting the current collecting plate via the opening so as to form an electrical connection with the current collecting plate.

18. The battery pack, of claim 17, wherein one of the terminal plate and the current collecting plate includes a protrusion that protrudes through the opening toward the other of the terminal plate and the current collecting plate and forms an electrical connection with the other of the terminal plate and the current collecting plate.

19. The battery pack of claim 17, wherein the current collector device includes a seal that surrounds the opening, and the seal is disposed between the sidewall and one of the terminal plate and the current collecting plate.

20. The battery pack of claim 16, wherein the current collector device consists of a current collecting plate that is
- disposed between the sidewall and the one of the positive electrode portions and the negative electrode portion,
- electrically connected to the one of the positive electrode portions and the negative electrode portions,
- oriented parallel to the sidewall and positioned so as to overlie the opening, and
- includes a protrusion that extends through the opening and forms a terminal.

\* \* \* \* \*

UNITED STATES PATENT AND TRADEMARK OFFICE
CERTIFICATE OF CORRECTION

PATENT NO. : 10,770,730 B2
APPLICATION NO. : 15/764829
DATED : September 8, 2020
INVENTOR(S) : Bisaro et al.

Page 1 of 1

It is certified that error appears in the above-identified patent and that said Letters Patent is hereby corrected as shown below:

In the Claims

In Claim 16, at Column 16, Lines 3-4: "a flexible metal laminated, polymer film sheet," should read --a flexible metal laminated polymer film sheet,--.

In Claim 18, at Column 16, Line 44: "The battery pack, of claim 17," should read --The battery pack of claim 17,--.

Signed and Sealed this
Nineteenth Day of January, 2021

Andrei Iancu
*Director of the United States Patent and Trademark Office*